(12) United States Patent
Ali et al.

(10) Patent No.: US 8,457,194 B2
(45) Date of Patent: Jun. 4, 2013

(54) PROCESSING REAL-TIME VIDEO

(75) Inventors: Walid Ali, Sammamish, WA (US); Rony Ferzli, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 773 days.

(21) Appl. No.: 12/240,009

(22) Filed: Sep. 29, 2008

(65) Prior Publication Data
US 2010/0080283 A1    Apr. 1, 2010

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *G06K 9/46* | (2006.01) |

(52) U.S. Cl.
USPC ....... 375/240.01; 375/240; 382/239; 382/240

(58) Field of Classification Search
None
See application file for complete search history.

(56) References Cited

U.S. PATENT DOCUMENTS

| | | | | |
|---|---|---|---|---|
| 5,351,084 | A | 9/1994 | Blair | 348/390 |
| 5,627,938 | A | 5/1997 | Johnston | 704/200.1 |
| 5,764,805 | A | 6/1998 | Martucci | 382/238 |
| 5,883,979 | A | 3/1999 | Beretta | 382/251 |
| 6,456,663 | B1 | 9/2002 | Kim | |
| 6,662,367 | B2 * | 12/2003 | Dapper et al. | 725/105 |
| 6,744,927 | B1 * | 6/2004 | Kato | 382/239 |
| 6,748,019 | B1 | 6/2004 | Lin | 375/240.24 |
| 6,965,697 | B1 | 11/2005 | Kondo | 382/232 |
| 7,116,835 | B2 | 10/2006 | Takahashi et al. | |
| 7,215,345 | B1 * | 5/2007 | Hanko | 345/620 |
| 7,292,602 | B1 | 11/2007 | Liu | 370/468 |
| 7,310,445 | B2 | 12/2007 | Kupeev et al. | |
| 7,321,672 | B2 | 1/2008 | Sasaki et al. | |
| 7,675,985 | B1 * | 3/2010 | Watson | 375/260 |
| 2003/0081854 | A1 * | 5/2003 | Deshpande | 382/261 |
| 2003/0108250 | A1 * | 6/2003 | Luo et al. | 382/263 |
| 2003/0135865 | A1 * | 7/2003 | Jung | 725/105 |
| 2003/0142213 | A1 * | 7/2003 | Ali et al. | 348/180 |
| 2005/0196072 | A1 * | 9/2005 | Zhong | 382/298 |

(Continued)

FOREIGN PATENT DOCUMENTS

WO    WO2007112820 A1    10/2007

OTHER PUBLICATIONS

Andrea Cavallaro et al., "Perceptual Semantics", 2006, *Idea Group Publishing*, ITB12970, pp. 1-20, http://www.igi-pub.com/downloads/excerpts//ITB12970.pdf.

(Continued)

*Primary Examiner* — Nathan Flynn
*Assistant Examiner* — Trang Doan
(74) *Attorney, Agent, or Firm* — Merchant & Gould (57) ABSTRACT

Real-time video processing functionality may be provided using pre-processing and/or post-processing features to provide a video signal. Components of a real-time video processing system may operate to receive a real-time video signal. The real-time video signal may be downscaled based in part on the use of features of a pre-processing component applying a downscale polyphase filter that may be used to compensate for bandwidth constraints associated with a real-time video conferencing environment. The downscaled real-time video may be communicated across a network, such as the Internet. Upon receipt of the downscaled real-time video, the downscaled real-time video may be upscaled based in part on the use of features of a post-processing component applying an upscale polyphase filter.

10 Claims, 5 Drawing Sheets

U.S. PATENT DOCUMENTS

| | | | |
|---|---|---|---|
| 2005/0213658 A1 | 9/2005 | Vitali et al. | 375/240.03 |
| 2006/0034512 A1* | 2/2006 | Sheraizin et al. | 382/173 |
| 2006/0222078 A1 | 10/2006 | Raveendran et al. | |
| 2006/0268990 A1 | 11/2006 | Lin et al. | 375/240.24 |
| 2007/0064816 A1 | 3/2007 | Chiang | 375/240.29 |
| 2007/0074266 A1 | 3/2007 | Raveendran et al. | |
| 2007/0091997 A1 | 4/2007 | Fogg | 375/240.1 |
| 2008/0018506 A1 | 1/2008 | Raveendran | 341/51 |
| 2008/0027732 A1 | 1/2008 | Baumgarte | 704/500 |
| 2008/0031538 A1 | 2/2008 | Jiang | 382/261 |
| 2008/0120676 A1 | 5/2008 | Morad | 725/127 |
| 2008/0211901 A1* | 9/2008 | Civanlar et al. | 348/14.09 |
| 2009/0073006 A1* | 3/2009 | Wegener | 341/61 |
| 2010/0080302 A1 | 4/2010 | Ali et al. | |

OTHER PUBLICATIONS

X.H. Zhang et al., "Improved estimation for just-noticeable visual distortion", SIGNAL Processing 85 (2005), pp. 795-808, http://www3.ntu.edu.sg/home/WSLin/sdarticleXH.pdf.

"Video and Image Processing Suite User Guide", Suite Version 8.0, Jun. 2008, Altera Corporation, pp. 1-198, http://www.altera.com/literature/ug/ug_vip.pdf.

Gratis, Libros, "Codec 6.2.5 Released—With Sharpening Filter!", Feb. 12, 2007, DivX Labs, pp. 1-3, http://labs.divx.com/node/7.

Klompenhouwer, Michiel, et al., "Subpixel Image Scaling for Color Matrix Displays", 2003, Philips Research Laboratories, pp. 1-13, http://www.es.ele.tue.nl/~dehaan/pdf/90_jsid2003.pdf.

Glover, Mark V., *Internetworking: Distance Learning 'To Sea' Via Desktop Videoconferencing*, "Tools and IP Multicoat Protocols, Chapter III, Major Videoconferencing Standards", Mar. 1998, Distance Learning—U.S. Navy Seanet, pp. 1-13, http://web.nps.navy.mil/~seanet/Distlearn/chp3.htm.

Punchihewa, Amal, et al., "Artefacts in Image and Video Systems: Classification and Mitigation", Nov. 26-28, 2002, Massey University, pp. 1-6, http://sprg.massey.ac.nz/pdfs/2002_IVCNZ_197.pdf.

U.S. Appl. No. 12/240,554, filed Sep. 29, 2008, entitled "Perceptual Mechanism for the Selection of Residues in Video Coders", Inventors: Walid Ali and Rony Ferzli.

U.S. Office Action mailed Mar. 29, 2012 in U.S. Appl. No. 12/240,554, 22 pages.

* cited by examiner

PROCESSING REAL-TIME VIDEO

RELATED APPLICATION

Related U.S. patent application Ser. No. 12/240,554, filed on even date herewith in the name of Walid Ali and Rony Ferzli, entitled "Perceptual Mechanism For The Selection of Residues In Video Codes," and assigned to the assignee of the present application, is hereby incorporated by reference.

BACKGROUND

Real-time video processing technology can be used to provide high quality video conferencing and other interactive environments. For example, video conferencing systems can be used to enable interactions between two or more participants at remote locations. Signal processing techniques can be used to enhance the user experience while participating in a video conference or in other real-time video applications. Bandwidth constraints can limit the amount of data that can be used when distributing a given bandwidth budget to multiple conferencing users. As an example, some techniques sacrifice quality to compensate for a system load when multiple users share a common real-time communication channel.

SUMMARY

This summary is provided to introduce a selection of concepts in a simplified form that are further described below in the Detailed Description. This summary is not intended to identify key features or essential features of the claimed subject matter, nor is it intended to be used to limit the claimed subject matter's scope.

Real-time video processing functionality may be provided using pre-processing and/or post-processing features to provide a video signal. Components of a real-time video processing system may operate to receive a real-time video signal. The real-time video signal may be downscaled based in part on the use of features of a pre-processing component applying a downscale polyphase filter that may be used to compensate for bandwidth constraints associated with a real-time video conferencing environment. The downscaled real-time video may be communicated across a network, such as the Internet. Upon receipt of the downscaled real-time video, the downscaled real-time video may be upscaled based in part on the use of features of a post-processing component applying an upscale polyphase filter.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated herein constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

In real-time video conferencing applications, many users share the same channel. Available bandwidth may become limited due to such usage. As such, video compression is performed using video encoding algorithms. To accommodate for as many video consumers as possible, the acquired video may be highly compressed. It is desired to maintain a high-level of real-time video quality even with a high compression ratio. This may accomplished through using pre-processing and post-processing to reduce the number of bits required to be transmitted over a network channel. As a result, the visual quality of the video remains high and a smaller amount of bandwidth is required.

Figure 1:
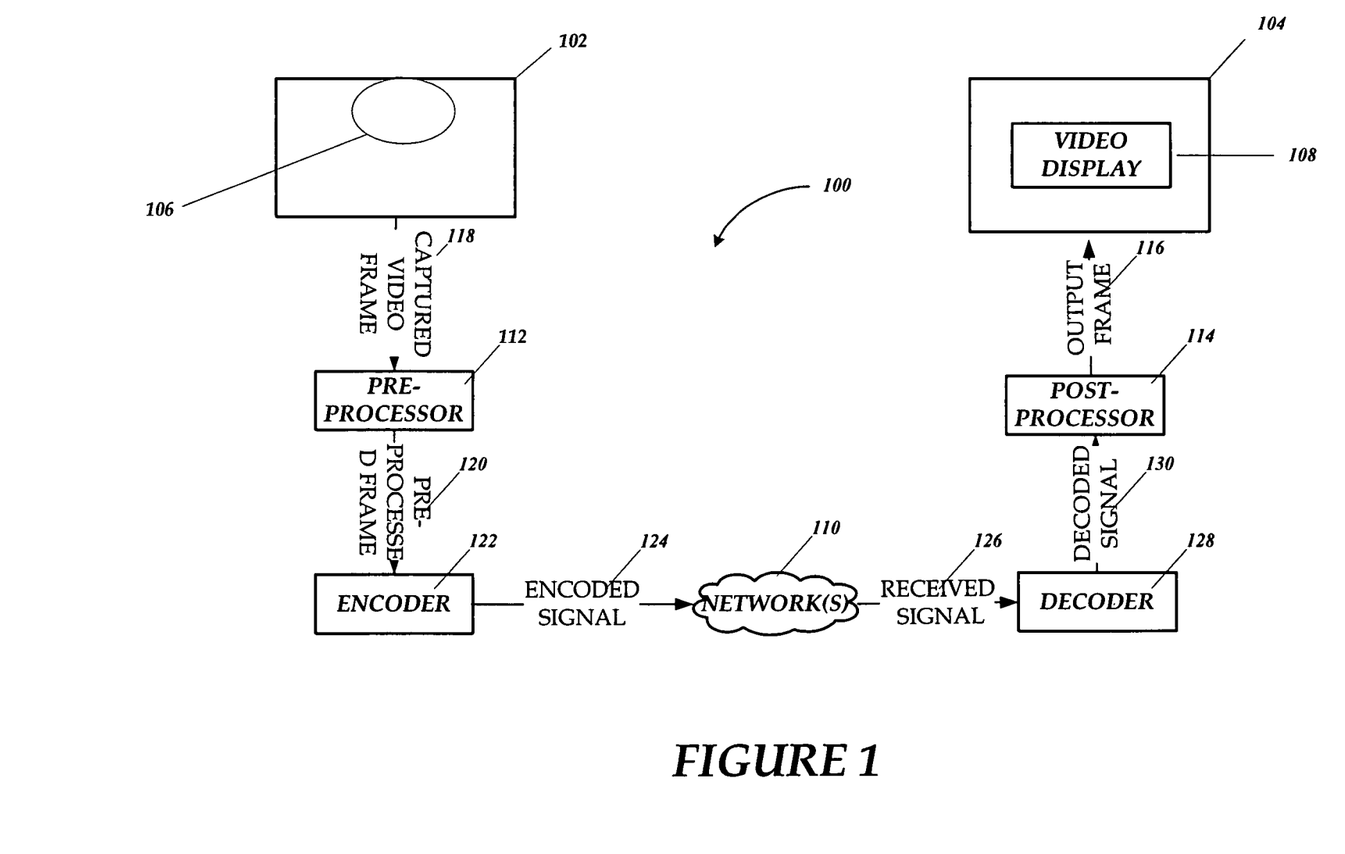
FIG. 1 is a block diagram illustrating a video processing system.

FIG. 1 is a diagram depicting a video system 100. Video system 100 includes a network 110 or networks enabling a number of participants with video transmission and reception capability to communicate with one another over network 110. A first participant device 102 and a second participant device 104 may include any computing device with audio/video capability such as a desktop, laptop computer, or other computing/communication device having a camera, microphone, speaker, display and/or video conferencing equipment.

As shown in FIG. 1, first participant device 102 includes a video acquisition device (video camera 106) and second participant device 104 includes a display 108. A video camera 106 and other video acquisition devices/systems may be used to provide video and other signals that may be used as part of a real-time video environment. As described below, pre-processing and/or post-processing features may be used to process captured pixel data irrespective of the mechanism or method used to capture the pixel data. For example, video camera 106 may be used to capture video at a designated frame rate (e.g., 15 frames/sec, 30 frames/sec, etc.) as part of a red-green-blue (RGB), YUV, or some other pixel format. Video camera 106 may be a separate component or video capture functionality may be integrated with first participant device 102. For example, a video camera 106 or other optical device may be wirelessly coupled or directly wired (e.g., Universal Serial Bus (USB), Peripheral Component Interface (PCI), etc.) to an associated video conferencing device and used to capture and process real-time participant video.

Correspondingly, video system 100 may include computing/communication devices having video capture functionality and associated video processing features. Moreover, video system 100 may include a plurality of computing/communication devices and the associated video capture functionality.

As described below, video system 100 may include a pre-processor 112 and/or a post-processor 114 both providing functionality that may be used to process pixel data as part of providing a video signal for display on an associated display 108. Video system 100 may operate more efficiently by using pre-processor 112 and/or post-processor 114 functionality to compensate for bandwidth and other communication constraints associated with a real-time video environment.

Pre-processed and/or post-processed signals may be communicated to one or more components of video system 100 for further processing and use in providing an output real-time video 116 to second participant device 104. A captured real-time video frame 118 may be transmitted to pre-processor 112, wherein pre-processor 112 may be operable to downscale the field of pixel data through the application of a polyphase filter (not shown). A resultant pre-processed video frame 120 may include a lesser number of pixels than the number of pixels in captured real-time video frame 118. Resultantly, transmission of pre-processed video frame 120 over a network 110 may require less bandwidth than transmission of captured real-time video frame 118.

For example, captured real-time video frame 118 may be pre-processed to provide pre-processed video frame 120. Pre-processed frame 120 may include approximately half the number of pixels as compared to captured real-time video frame 118. Pre-processed video frame 120 may be communicated to an encoder 122 for further processing. Correspondingly, a lower number of encoding operations are required by encoder 122 since pre-processed video frame 120 includes less pixel data than captured real-time video frame 118.

An encoded signal 124 may be transmitted over network 110 and a received signal 126 may be decoded by a decoder 128. A decoded signal 130 may be transmitted to post-processor 114 where decoded signal 130 may be upscaled using a polyphase upscaling filter. When decoded signal 130 is upscaled, resultant output real-time video 116 may have the same number of rows and columns of pixels as captured real-time video frame 118. Output real-time video 116 may then be subsequently displayed in real-time at display 108.

Video processing system 100 may monitor bandwidth availability on network 110. A threshold level of data that may be transmitted on network 110 wherein high quality real-time video may be maintained determined. This data threshold may be applied to the downscaling and upscaling polyphase filters such that appropriate degrees of scaling may be used based on the determined available bandwidth on network 110.

With continuing reference to FIG. 1, network 110 may include any communication network or combination of networks. A real-time video conference may be facilitated by a single device/program or by a combination of devices and programs. For example, an audio/video server, firewall server, and/or mediation servers may be included and used for different aspects of a conference, such as storage and processing of audio and/or video files, security, and/or interconnection of various networks for real-time communication between conference participants. Any of these example tasks and others may be performed by software, hardware, and/or a combination of hardware and software. Additionally, functionality of one or more servers may be further combined to reduce the number of components.

With continuing reference to FIG. 1, and as further example in a videoconferencing context, a Multipoint Control Unit (MCU) (not shown) may be used as a primary facilitator of a real-time video conference in coordination with one or more of other components, devices, and/or systems. MCU may use various protocols such as Internet Protocol (IP) and variations thereof for example, and be structured as software program(s), hardware, or some combination thereof. MCU may be implemented as a stand-alone hardware device, or embedded into dedicated conferencing devices (e.g., audio/video server, mediation servers, etc.). Additionally, MCU may be implemented as a decentralized multipoint, where each station in a multipoint call exchanges video and audio directly with the other stations with no central manager.

Figure 2:
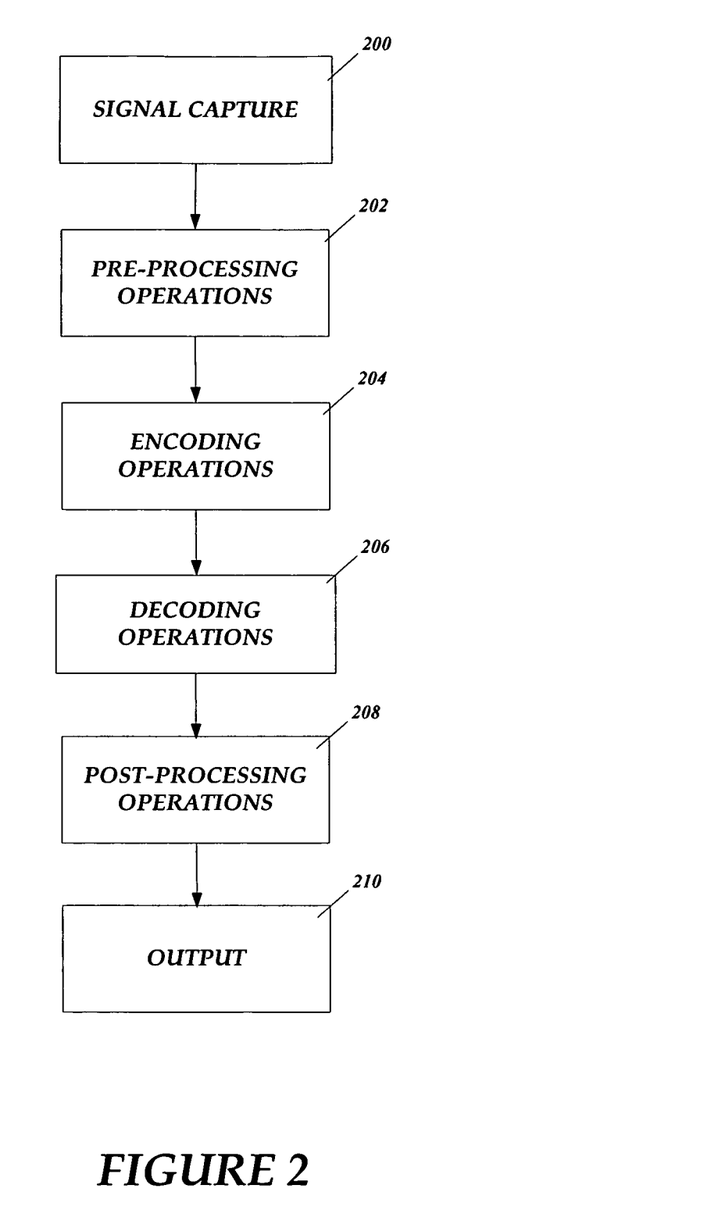
FIG. 2 is a flow chart of a method for providing real-time video processing.

FIG. 2 is a flow diagram that illustrates a process of processing a real-time video signal. For example, the flow may be used to provide a high quality real-time video stream to one or more participants of a video conference while using a reduced amount of bandwidth on network 110. The components of FIG. 1 are used in the following description, but the process is not so limited. For example, a first participant device 102 may use any real-time video system including, a video conferencing device, such as a laptop, desktop, handheld, or other computing device and a video camera 106 (whether internal or external) to capture captured real-time video frames 118 at some frame rate associated with a real-time video environment.

Video camera 106 or other optical device may be wirelessly coupled or directly wired to first participant device 102 and used to receive information associated with a real-time video processing environment to provide a captured real-time video frame 118 at 200. At 202, pre-processor 112 may operate to downscale captured real-time video frame 118 to provide pre-processed video frame 120. For each captured real-time video frame 118, the pre-processor 112 may create a frame buffer containing a number of rows equal to the number of columns in captured real-time video frame 118 multiplied by a scaling factor and a number of columns equal to the number of rows in captured real-time video frame 118.

Pre-processor 112 may fetch from memory a predetermined number of pixels from a video frame row wherein the predetermined number is a filter length. Pre-processor 112 may fetch from memory filter coefficients corresponding to the predetermined filter length. The fetched pixels may be multiplied by the corresponding filter coefficients. The results of these multiplications may be stored in a frame buffer. Pre-processor 112 may transpose the frame buffer into pre-processed video frame 120 containing a number of rows equal to the number of columns in the captured real-time video frame 118 multiplied by a downscaling factor and containing a number of columns equal to the number of rows in the captured real-time video frame 118 multiplied by a downscaling factor.

At 204, pre-processed signal 120 may be loaded to encoder 122 for encoding operations. For example, encoder 122 may include functionality to perform quantization/de-quantization operations, compression operations, motion estimation operations, transform/inverse transform operations, de-blocking operations, prediction operations, variable-length and/or other coding operations, etc. Encoded signal 124 may be communicated across network 110. At 206, received encoded signal 126 provided by encoder 122 may be decoded by decoder 128 to produce decoded signal 130.

At 208, post-processor 114 may receive decoded signal 130 and upscale decoded signal 130 such that output real-time video 116 may contain the same number of rows and columns as captured real-time video frame 118. For each video frame in decoded signal 130, post-processor 114 may create a frame buffer containing a number of rows equal to the number of columns in the video frame in decoded signal 130 multiplied by a upscaling factor and a number of columns equal to the number of rows in the decoded signal 130.

Post-processor 114 may fetch from memory a predetermined number of pixels from a row in a video frame in decoded signal 130. The predetermined number may be an upscale filter length. Post-processor 114 may fetch from memory upscale filter coefficients corresponding to the predetermined upscale filter length. The fetched pixels may be subsequently multiplied by the corresponding upscale filter coefficients. The results of these multiplications may be stored in a frame buffer. Post-processor 114 may transpose the frame buffer into output real-time video 116 containing a number of rows and columns equal to the number of rows and columns in the captured real-time video frame 118.

At 210, post-processor 114 may provide output real-time video 116 consisting of upscaled video frames of pixel data from the processed fields of pixel data that may be displayed on display 108.

Figure 3:
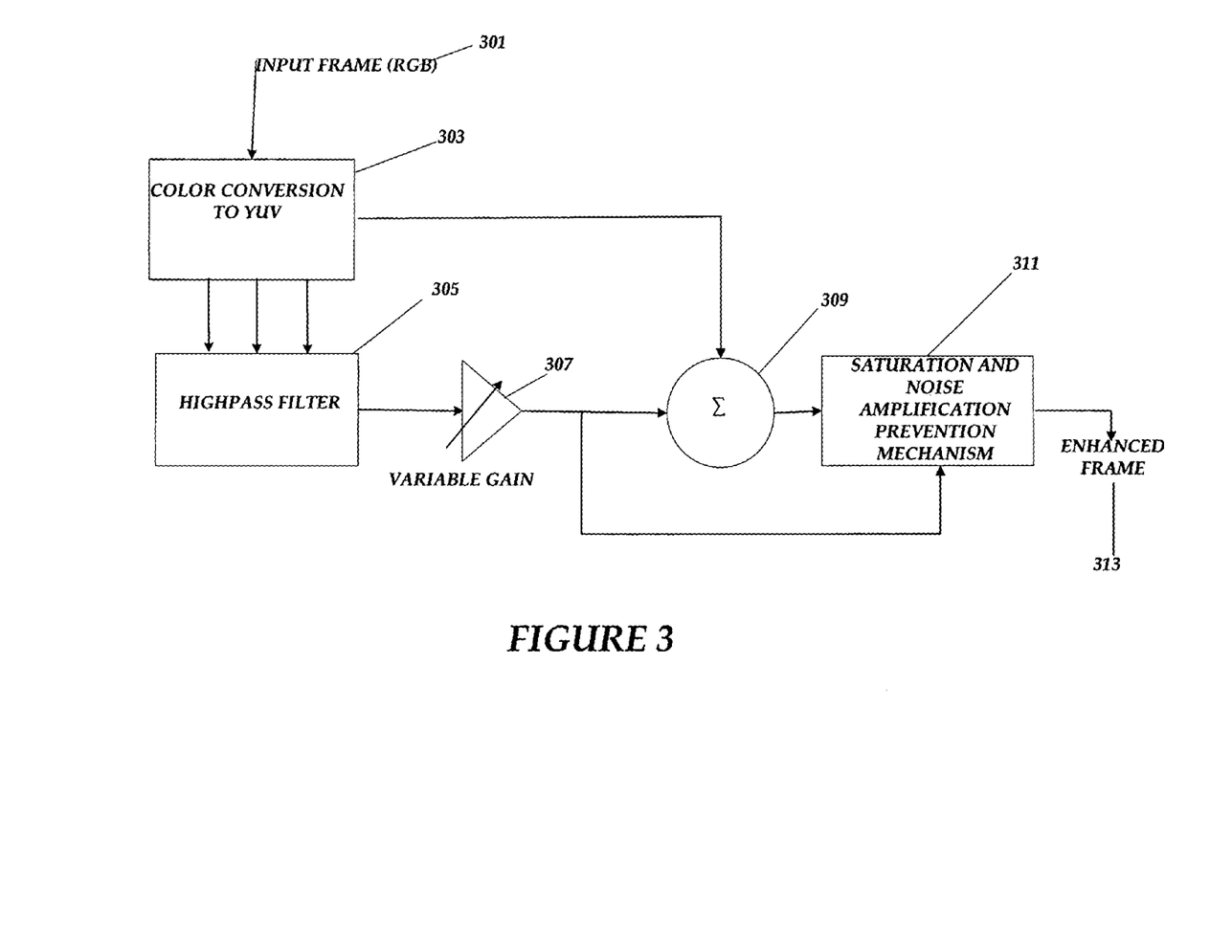
FIG. 3 is a diagram that illustrates a process of sharpening a video signal.

FIG. 3 is a diagram that illustrates a process of sharpening a video signal. An input frame 301 may represent a video frame that has gone through the pre-processing, encoding, decoding, and post-processing according to an embodiment as described above. Input frame 301 may be provided to the sharpening algorithm in a RGB format. Input frame 301 may proceed to stage 303 at that point a color conversion may occur that converts input frame 301 from RGB format to YUV color format. A copy of the YUV-converted frame formed at stage 303 is passed to stage 309 wherein it will be used in conjunction with the results of stages 305 and 307 as described below.

Each color channel of the YUV-converted frame from stage 303 may be passed to a highpass filter illustrated at stage 305. The highpass filter at 305 may receive each of the color channels and extract the details of the frame. Highpass filters, contrary to low-pass filters, may attenuate the low frequency image components and in particular, make it possible to accentuate details and contrast. A filter may be a mathematical transformation that allows the value of a pixel to be modified according to the values of neighboring pixels, with coefficients, for each pixel of the region to which it is applied. The filter may be represented by a table (matrix), that may be characterized by its dimensions and its coefficients, whose center corresponds to the pixel concerned. The table coefficients may determine the properties of the filter. The highpass filter at 305 may apply a 5×5 masking pixel to each pixel in the upscaled video frame.

The extracted details from 305 may be passed through a variable gain controller at stage 307. The variable gain controller at 307 may further eliminate noise from the video signal. After the extracted video frame details are passed through the variable gain controller at 307, the resultant details may be added back to the original video frame at stage 309.

Each pixel may be attenuated by a value (e.g., 0.125) to obtain the correction factor. A saturation function may be applied to the correction factor that limits the correction factor to a pre-determined range (e.g., between −5 and 125). Each pixel may be added to its calculated correction factor. Then it may be determined if the resultant addition value is greater than a predetermined value (e.g., 240). If the addition value is greater than the predetermined value, the original pixel may not be updated and remains identical to the pixel received by the sharpening algorithm. If the addition value is not greater than the predetermined value, the original pixel may be updated with the correction factor. The sharpening algorithm may skip pixels on the borders of the video frame (e.g., the two vertical and horizontal lines of pixels on the edges of the frame.

One disadvantage to the use of high-pass filters and subsequent addition to the original video frame is the possibility of saturation that may lead to so-called "artifacts" in the video data. One example of a negative impact of "artifacts" in real-time video data is resultant jittering in the received video stream.

To counteract any potential negative impacts of using a high-pass filter, the video frame information may proceed to stage 311. At 311 a saturation and noise amplification prevention mechanism may be applied to the video frame. 311 may involve clipping mechanisms as well as coring mechanisms that may be applied to low value pixels to counteract any amplified noise such that the resultant signal remains high-quality even when being processed in real time.

Figure 4:
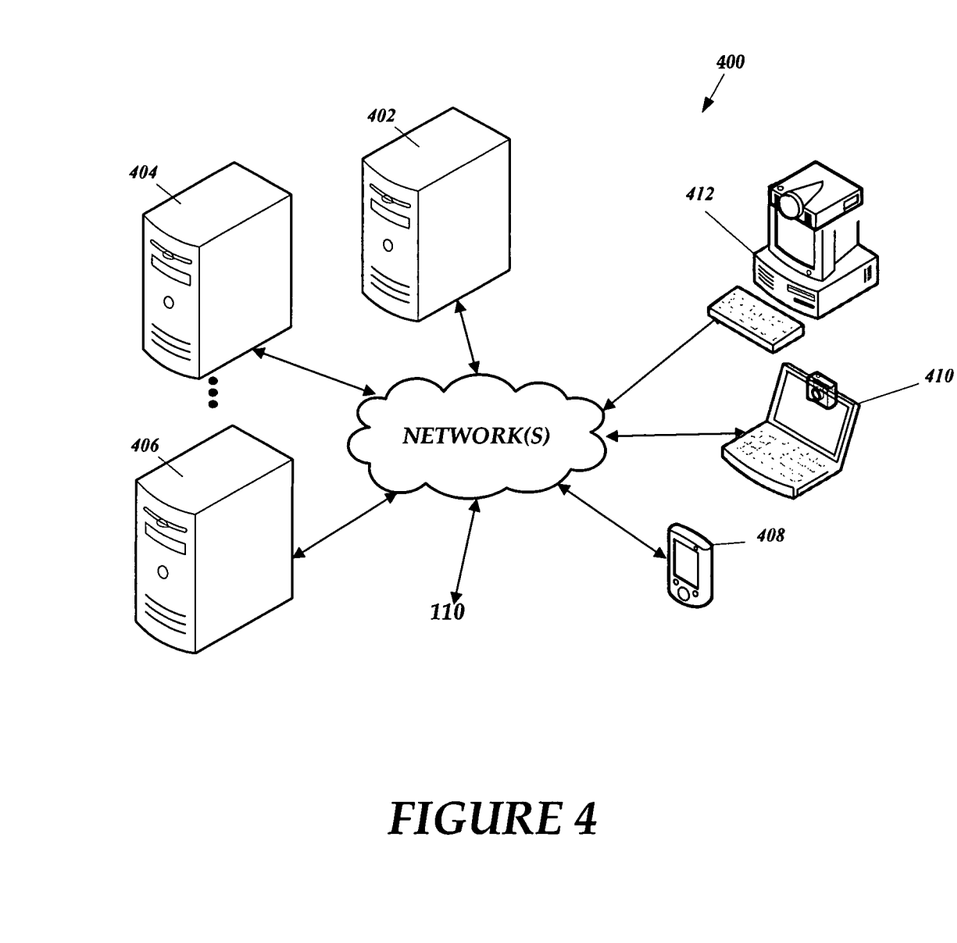
FIG. 4 illustrates a networked environment.

FIG. 4 illustrates a networked environment 400. Real-time video processing operations may be implemented in networked environment 400. As shown in FIG. 4, networked environment 400 may include a topology of servers (e.g., a web server 402, a mediation server 404, a collaboration server 406, etc.), clients, devices, Internet service providers, communication media, and/or other network/communication functionality. Networked environment 400 may include a static or dynamic topology. Video conferencing devices (e.g., a smart phone 408, a laptop 410, a desktop 412, etc.) may be configured with a video camera 106 to provide a real-time video stream to one or more components of networked environment 400. A user may use a video camera 106 that includes various augmentation features that may be used to provide a real-time video stream to a second participant device 104.

Networked environment 400 may include a secure network such as an enterprise network, an unsecure network such as a wireless open network, the Internet, or some other network or combination of networks. By way of example, and not limitation, networked environment 400 may include wired media such as a wired network or direct-wired connection, and/or wireless media such as acoustic, radio frequency (RF), infrared, and/or other wireless media. Many other configurations of computing devices, applications, data sources, data distribution systems, etc. may be employed to implement video processing and other functionality. Moreover, networked environment 400 of FIG. 4 is included for illustrative purposes. Embodiments are not limited to the example applications, modules, devices/systems, or processes described herein.

Exemplary Operating Environment

Figure 5:
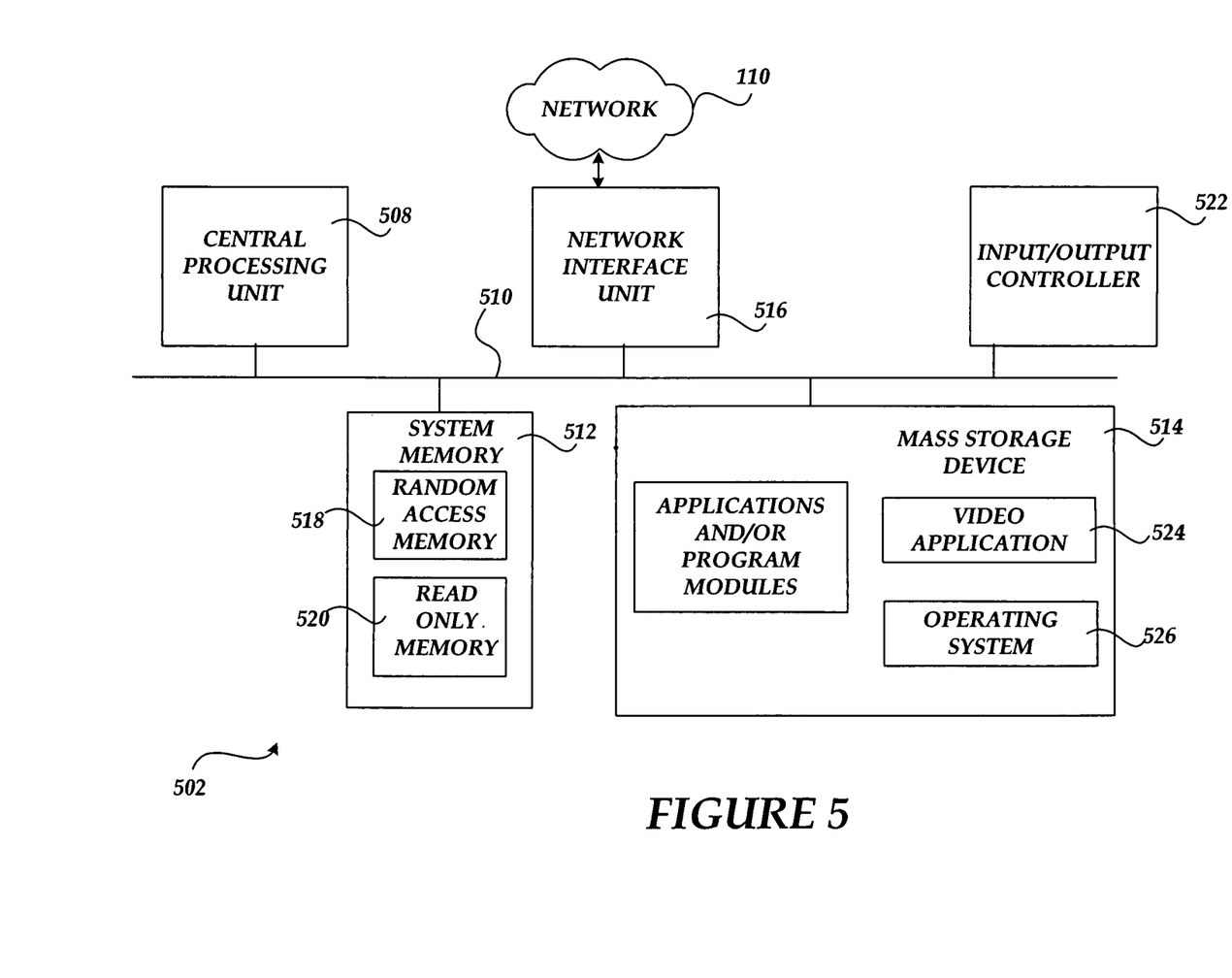
FIG. 5 is a block diagram illustrating a computing environment.

Referring now to FIG. 5, the following discussion is intended to provide a brief, general description of a computing environment. While the invention is described in the general context of program modules that execute in conjunction with program modules that run on an operating system on a personal computer, those skilled in the art will recognize that the invention may also be implemented in combination with other types of computer systems and program modules.

Generally, program modules may include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 5, a computing device 502 may comprise a general purpose desktop, laptop, handheld, tablet, or other type of computer capable of executing one or more application programs. Computing device 502 may include at least one central processing unit 508 ("CPU"), a system memory 512, including a random access memory 518 ("RAM"), a read-only memory ("ROM") 520, and a system bus 510 that couples the memory to CPU 508. A basic input/output system containing the basic routines that help to transfer information between elements within the computer, such as during startup, may be stored in ROM 520.

Computing device 502 may further include a mass storage device 514 for storing an operating system 526, application programs, and/or other program modules. Mass storage device 514 may be connected to CPU 508 through a mass storage controller (not shown) connected to bus 510. Mass storage device 514 and its associated computer-readable media may provide non-volatile storage for computing device 502. Although the description of computer-readable media contained herein refers to mass storage device 514, such as a hard disk or CD-ROM drive, it should be appreciated by those skilled in the art that computer-readable media may be any available media that may be accessed or utilized by computing device 502.

Computer-readable media may comprise computer storage media and communication media. Computer storage media may include volatile and non-volatile, removable and non-removable media implemented in any method or technology for storage of information such as computer-readable instructions, data structures, program modules or other data. Computer storage media may include RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium that may be used to store the desired information and which may be accessed by computing device 502.

Computing device 502 may operate in networked environment 400 using logical connections to remote computers through network 110, such as a local network, the Internet, etc. for example. Computing device 502 may connect to network 110 through a network interface unit 516 connected to bus 510. It should be appreciated that network interface unit 516 may be utilized to connect to other types of networks and remote computing systems. Computing device 502 may include an input/output controller 522 for receiving and processing input from a number of input types, including a keyboard, mouse, keypad, pen, stylus, finger, speech-based, and/or other means. Other input means are available including combinations of various input means including video camera 106. Similarly, input/output controller 522 may provide output to a display, a printer, or other type of output device. Additionally, a touch screen or other digitized device may serve as an input and an output mechanism.

As mentioned briefly above, a number of program modules and data files may be stored in mass storage device 514 and RAM 518 of computing device 502, including an operating system 526 suitable for controlling the operation of a networked personal computing device, such as the WINDOWS operating systems from MICROSOFT CORPORATION of Redmond, Wash. Mass storage device 514 and RAM 518 may also store one or more program modules. Mass storage device 514, or other storage, and RAM 518 may store other application programs or modules, including video application 524.

Components of the systems/devices described above may be implemented as part of networked, distributed, and/or other computer-implemented and communication environments. Moreover, the real-time video processing functionality may be used in conjunction with a desktop computer, laptop, smart phone, personal data assistant (PDA), ultra-mobile personal computer, and/or other computing or communication devices to provide real-time video data. Aspects of a real-time video processing system may be employed in a variety of computing/communication environments. A real-time video conferencing system may include devices/systems having networking, security, and other communication components that are configured to provide communication and other functionality to other computing and/or communication devices.

While certain communication architectures are shown and described herein, other communication architectures and functionalities may be used. Additionally, functionality of various components may be also combined, further divided, expanded, etc. The various embodiments described herein may also be used with a number of applications, systems, and/or other devices. Certain components and functionalities may be implemented in hardware and/or software. While certain embodiments include software implementations, they are not so limited and also encompass hardware, or mixed hardware/software solutions. Accordingly, the embodiments and examples described herein are not intended to be limiting and other embodiments are available.

It should be appreciated that various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of a computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that may contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program may be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data may also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

All rights including copyrights in the code included herein are vested in and the property of the Applicant. The Applicant retains and reserves all rights in the code included herein, and grants permission to reproduce the material only in connection with reproduction of the granted patent and for no other purpose.

What is claimed is:

1. A method of processing real-time video comprising:
   receiving a real-time video signal within a video conferencing application where a plurality of users are sharing the same bandwidth-constrained channel to transmit the real-time video signal;
   downscaling the real-time video signal with a polyphase downscale filter;
   encoding the real-time video signal;
   communicating the real-time video signal across a network;
   decoding the real-time video signal;
   upscaling the real-time video signal with a polyphase upscale filter; and
   sharpening the upscaled real-time video signal, wherein sharpening upscaled real-time video signal comprises:
      masking a pixel within the video frame;
      obtaining a correction factor by attenuating the resultant masked pixel value by a pre-determined gain value;
      applying a saturation function to the correction factor;
      determining whether the value of each pixel combined with the correction factor is greater than a pre-determined value; and
      updating the pixel if the pixel combined with the correction factor is not greater than a pre-determined value.

2. The method of claim 1, further comprising: applying the sharpening algorithm of claim 1 to all pixels within the frame except pixels located on the border of the frame.

3. The method of claim 1, further comprising: applying the sharpening algorithm of claim 1 to each color channel associated with the real-time video signal.

4. The method of claim 1, further comprising: receiving the real-time video signal from a web-based video camera.

5. The method of claim 1, further comprising:
   monitoring the bandwidth availability on the network;
   determining a threshold level of data that can be transmitted on the network; and
   applying the threshold to the downscaling and upscaling polyphase filters.

6. A real-time video processing device comprising:
   a video acquisition device configured to capture a real-time video signal within a video conferencing application where a plurality of users are sharing the same bandwidth-constrained channel to transmit the real-time video signal;

a pre-processor configured to:
  process the captured real-time video signal;
  provide a set of pre-processed pixel data, the set of pre-processed pixel data including a subset of pixels associated with a first frame of pixel data from the real-time video signal; and
  define a second frame of pixel data requiring less bandwidth to communicate than the first frame of pixel data by use of a polyphase downscale filter;
a post-processor configured to:
  process the second frame of pixel data;
  provide a set of post-processed pixel data, the set of post-processed pixel data including a plurality of reconstructed pixel values determined in part by multiplying a plurality of pixel values from the second frame of pixel data by a plurality of weights to obtain a reconstructed real-time video frame associated with the captured real-time video signal by the use of a polyphase upscale filter;
an encoder configured to encode the second frame of pixel data;
a decoder configured to decode the encoded pixel data; and
a sharpening processor configured to sharpen the reconstructed real-time video frame, wherein the sharpening processor is configured to:
  mask a pixel within the reconstructed real-time video frame;
  obtain a correction factor by attenuating the resultant masked pixel value by a pre-determined gain value;
  apply a saturation function to the correction factor;
  determine whether the value of each pixel combined with the associated correction factor is greater than a pre-determined value; and
  update the pixel if the pixel combined with the correction factor is not greater than a pre-determined value.

7. The real-time video processing device of claim 6, where the video acquisition device comprises: a video camera capable of capturing a real-time video signal.

8. The real-time video processing device of claim 6, wherein the sharpening processor is configured to sharpen all pixels except pixels located on the border of the reconstructed real-time video frame.

9. The real-time video processing device of claim 6, wherein the sharpening processor is configured to: sharpen each color channel associated with the real-time video signal.

10. The real-time video processing device of claim 6, further comprising: a monitoring processor configured to: monitor bandwidth availability on the network; determine a threshold level of high-quality video data that can be transmitted on the network; and apply the threshold of data to be transmitted to the downscaling and upscaling polyphase filters.

\* \* \* \* \*